United States Patent [19]
Yang

[11] Patent Number: 5,956,093
[45] Date of Patent: Sep. 21, 1999

[54] METHOD FOR CONTROLLING VIDEO/AUDIO MODES IN VIDEO/AUDIO OUTPUTTING APPARATUS

[75] Inventor: Jae Mo Yang, Suwon, Rep. of Korea

[73] Assignee: Samsung Electronics Co., Ltd., Rep. of Korea

[21] Appl. No.: 08/940,294

[22] Filed: Sep. 30, 1997

[30] Foreign Application Priority Data

Dec. 6, 1996 [KR] Rep. of Korea ...... 96-62517

[51] Int. Cl.⁶ .................................... H04N 5/50
[52] U.S. Cl. .................. 348/554; 348/553; 348/555; 348/569; 348/482
[58] Field of Search .................. 348/553, 554, 348/555, 556, 558, 569, 570, 705, 706, 722, 734, 482, 483, 484, 485, 738; 381/61, 103; 352/27, 37; H04N 5/50, 5/445, 5/60, 5/262, 5/268

[56] References Cited

U.S. PATENT DOCUMENTS

| | | | |
|---|---|---|---|
| 4,626,892 | 12/1986 | Nortrup | 358/21 |
| 5,173,778 | 12/1992 | Sasaki | 358/188 |
| 5,530,924 | 6/1996 | Miller | 455/186.1 |
| 5,543,925 | 8/1996 | Timmermans | 358/310 |
| 5,657,091 | 8/1997 | Bertram | 381/61 |
| 5,673,088 | 9/1997 | Nah | 348/555 |

FOREIGN PATENT DOCUMENTS 8-098111  4/1996  Japan ........................ H04N 5/60

*Primary Examiner*—John K. Peng
*Assistant Examiner*—Wesner Sajous
*Attorney, Agent, or Firm*—Dilworth & Barrese

[57] ABSTRACT

An apparatus and a method for controlling video/audio modes in a video/audio outputting apparatus is provided, in which the audio mode is automatically set in relation to the video mode selected by the user. A judgment is made whether an inputted working command code is a video mode code or an audio mode code. If the working command code thus judged is a video mode code, then it is judged whether it is a custom mode, a standard mode, a movie mode, a dynamic mode or a mild mode. Then a value is set to the video mode code thus judged, and at the same time, a value is set to the audio mode. Meanwhile, if the working command code thus judged is a an audio mode code, then it is judged as to whether it is a custom mode, a standard mode, a movie mode, a music mode or a soft mode. Then a value is set to the audio mode code thus judged. Therefore, according to the invention, when a user watches pictures and listens to sounds and only selects the video mode, the video signals are processed according to the selected video mode, while at the same time the audio signals are automatically processed in an audio mode corresponding to the selected video mode.

7 Claims, 5 Drawing Sheets

METHOD FOR CONTROLLING VIDEO/AUDIO MODES IN VIDEO/AUDIO OUTPUTTING APPARATUS

BACKGROUND OF THE INVENTION

1. Field of the Invention

The present invention relates to an apparatus and a method for outputting signals and more particularly, to an apparatus and a method for controlling video/audio modes in a video/audio outputting apparatus in which the audio signal output mode is set automatically in relation to the video signal output mode selected by the user.

2. Description of the Prior Art

Existing video/audio outputting apparatuses for outputting video signals and outputting audio signals, such as television sets, are capable of displaying video signals on screens after processing them in accordance with a user selected video mode or format and are capable of outputting audio signals to speakers after processing them in accordance with a user selected audio mode or format.

For example, when watching a movie on a television, the video signals can be processed for display in a movie mode or format, such mode being selected by the user. Furthermore, a user may select the video signals to be processed for display in other modes or formats such as a custom mode, a standard mode, a dynamic mode or a mild mode, which correspond to the viewer's desire to view a custom image, a standard image, a dynamic image or a mild image, respectively.

Similarly, the audio signals which accompany the displayed images can be outputted in a mode or format selected by the user. For example, by adjusting an equalizer in accordance with the selection of the user, the audio signals can be processed and outputted in a custom mode, a standard mode, a movie mode, a music mode or a soft mode.

This conventional technique will be described in detail by referring to FIGS. 1A and 1B, which is a flow chart illustrating a conventional method for controlling video/audio modes.

As shown in the drawing at step S1, it is judged whether a user generated working command code is a code corresponding to a video mode (hereinafter referred to as "video mode code") or a code corresponding to an audio mode (hereinafter referred to as "audio mode code"). If the working command code which has been judged at step S1 is a video mode code, then at steps S2–S6 it is judged whether the video mode code is a custom mode, a standard mode, a movie mode, a dynamic mode or a mild mode.

If the video mode code which has been judged at steps S2–S6 is a custom mode, then a value of the video mode is set to the custom mode at step S7. If it is a standard mode, a value of the video mode is set to the standard mode at step S8. If it is a movie mode, a value of the video mode is set to the movie mode at step S9. If it is a dynamic mode, a value of the video mode is set to the dynamic mode at step S10. If it is a mild mode, a value of the video mode is set to the mild mode at step S11.

Meanwhile, if the working command code which has been judged at step S1 is an audio mode code, then it is judged at steps S12–S16 whether the audio mode code is a custom mode, a standard mode, a movie mode, a music mode or a soft mode.

If the audio mode code which has been judged at steps S12–S16 is a custom mode, then a value of the audio mode is set to the custom mode at step S17. If it is a standard mode, a value of the audio mode is set to the standard mode at step S18. If it is a movie mode, a value of the audio mode is set to the movie mode at step S19. If it is a music mode, a value of the audio mode is set to the music mode at step S20. If it is a soft mode, a value of the audio mode is set to the soft mode at step S21.

However, in the above described conventional method, both the video mode and the audio mode have to be set separately by the user in accordance with the types of images to be displayed. Therefore, much inconvenience results to the user.

SUMMARY OF THE INVENTION

The present invention is intended to overcome the above described disadvantage of the conventional method.

Therefore, it is an object of the present invention to provide an apparatus and a method for controlling video/audio modes in a video/audio outputting apparatus, in which the audio mode is automatically set when the user sets the video mode.

To achieve the above object, the following method is employed. A judgment is made whether a user inputted working command code is a video mode code or an audio mode code.

If the working command code thus judged is a video mode code, then it is judged whether it is a custom mode, a standard mode, a movie mode, a dynamic mode or a mild mode. Then a value is set to the video mode code thus judged, and at the same time, a value is set to the audio mode.

Meanwhile, if the working command code thus judged is an audio mode code, then it is judged as to whether it is a custom mode, a standard mode, a movie mode, a music mode or a soft mode. Then a value is set to the audio mode code thus judged.

Therefore, according to the invention, when a user watches pictures and listens to sounds and only selects the video mode, the video signals are processed according to the selected video mode, while at the same time the audio signals are automatically processed in an audio mode corresponding to the selected video mode.

The apparatus of the present invention includes: a micro-computer for controlling video and audio processing in accordance with video and audio modes selected by the working commands of a user and for automatically selecting an audio mode which corresponds to a video mode selected by the working commands of the user; a working command inputting section for inputting working commands into the micro-computer; a broadcast signal receiving section controlled by the micro-computer, for receiving broadcast signals of a selected channel and for outputting video and audio signals; a video signal processing section controlled by the micro-computer, for selecting and processing external video signals and the video signals of the broadcast signal receiving section; and an audio signal processing section under the control of the micro-computer, for selecting and processing external audio signals and the audio signals of the broadcast signal receiving section.

BRIEF DESCRIPTION OF THE DRAWINGS

The above object and other advantages of the invention will become more apparent by describing in detail an illustrative embodiment of the invention with reference to the attached drawings in which.

DETAILED DESCRIPTION OF THE PREFERRED EMBODIMENT

Figure 1A:
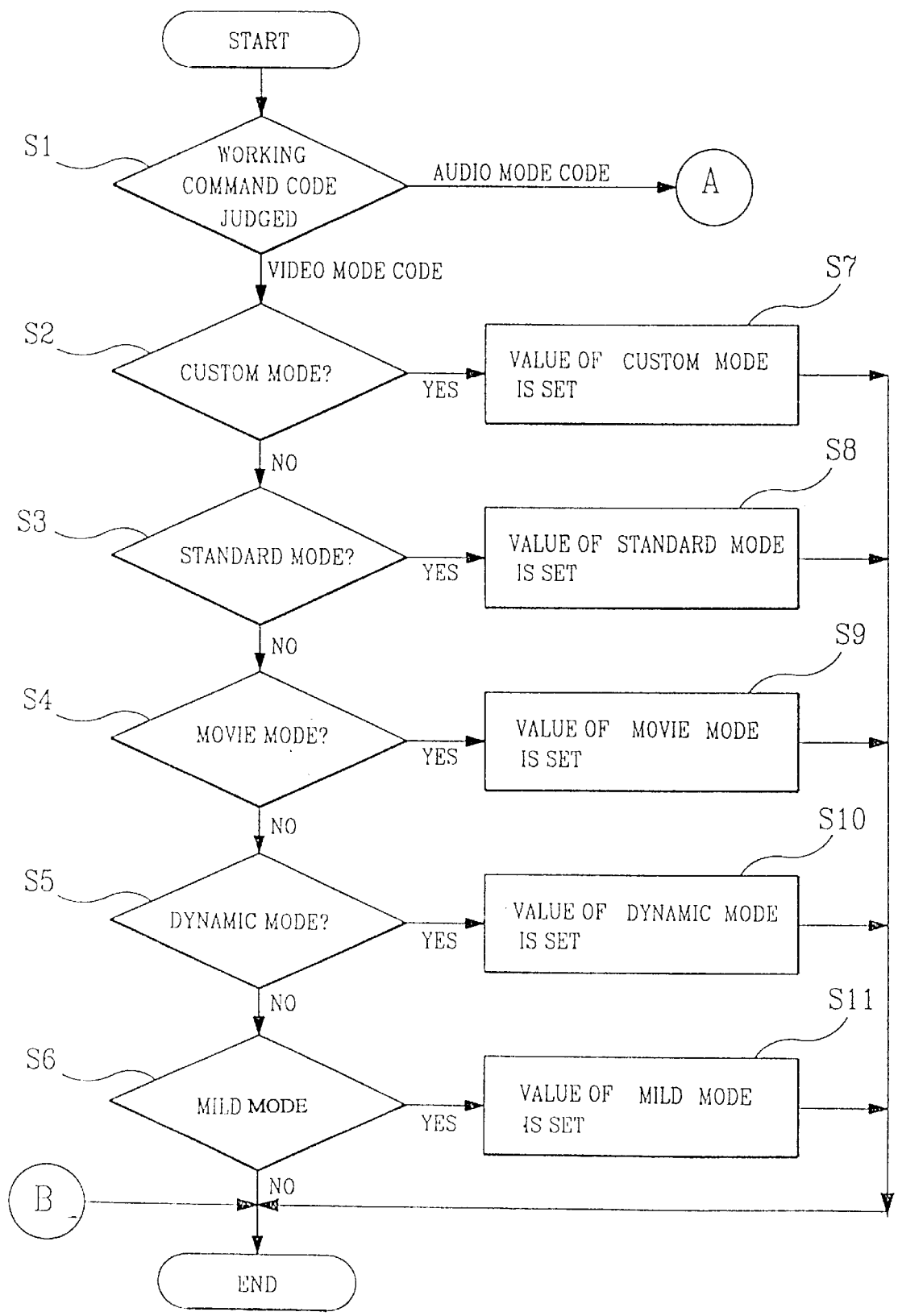
FIGS. 1A and 1B illustrate a flow chart of a conventional video/audio mode control method.
Figure 1B:
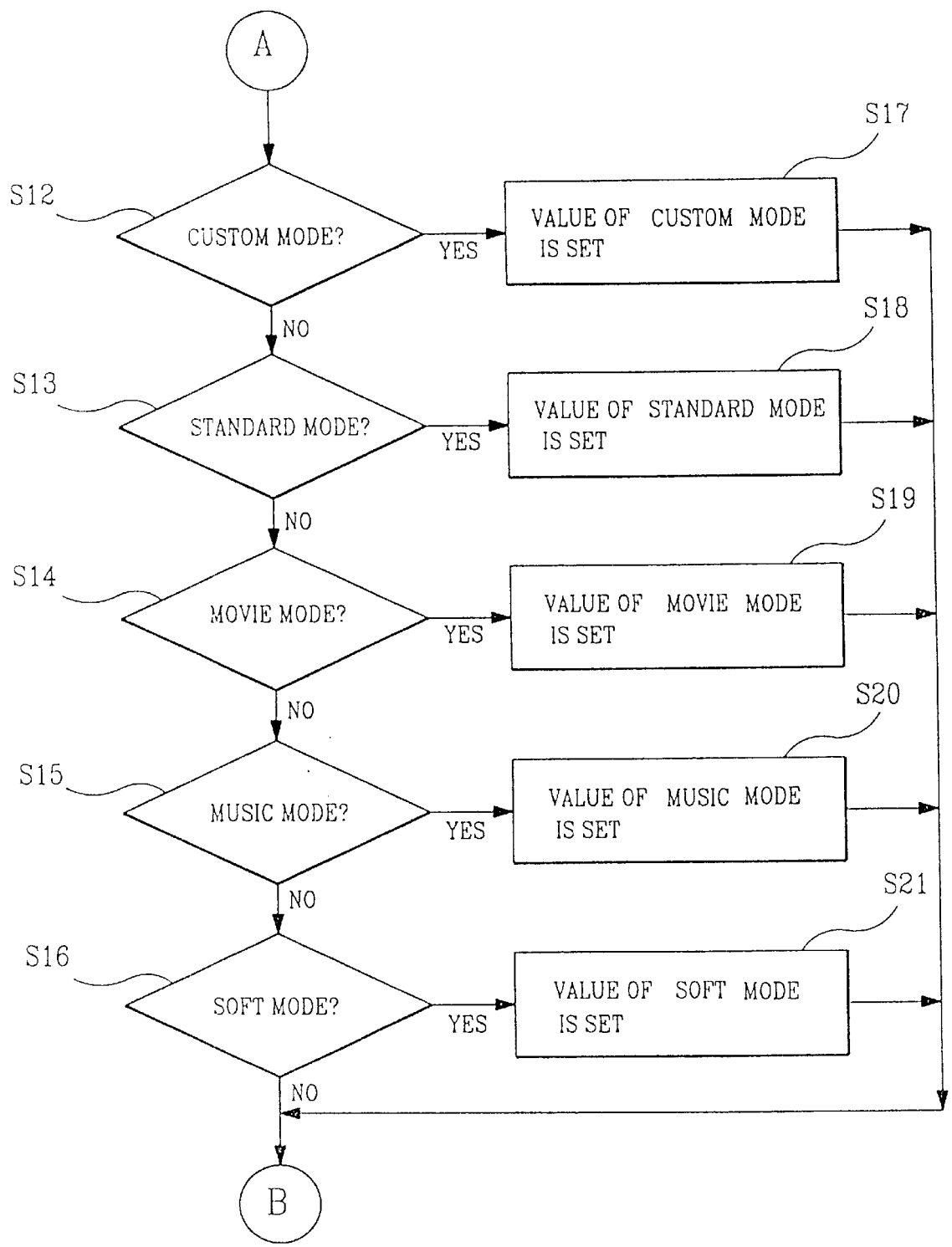
Figure 2:
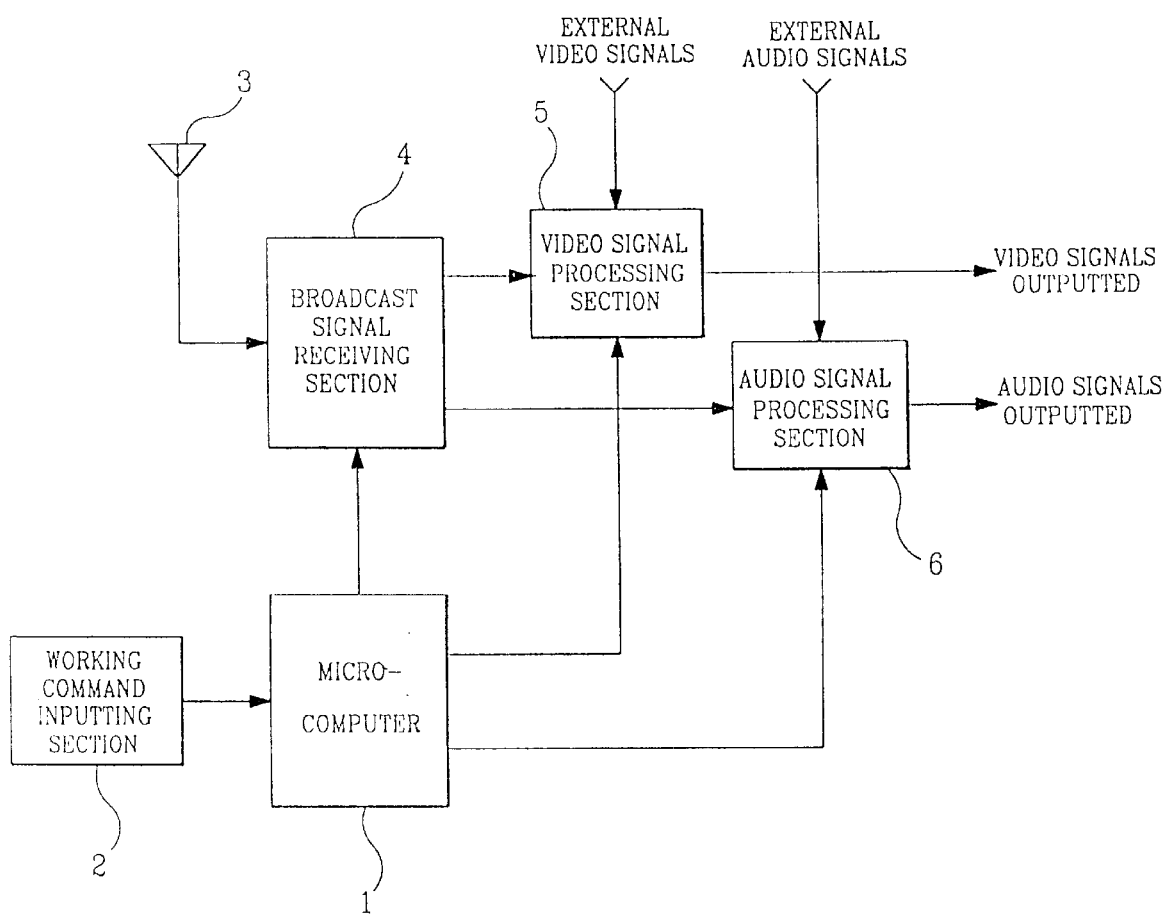
FIG. 2 is a block diagram of a video/audio outputting apparatus to which the video/audio mode control method of the invention is applied.

As shown in FIG. 2, the video/audio outputting apparatus to which the invention is applied includes: a micro-computer 1 for controlling video and audio processing in accordance with video and audio modes selected by the working commands of a user; a working command inputting section 2 for inputting working commands into the micro-computer 1; a broadcast signal receiving section 4 controlled by the micro-computer 1, for receiving broadcast signals of a selected channel from an antenna 3 and for outputting video and audio signals; a video signal processing section 5 controlled by the micro-computer 1, for selecting and processing external video signals and the video signals of the broadcast signal receiving section 4; and an audio signal processing section 6 under the control of the micro-computer 1, for selecting and processing external audio signals and the audio signals of the broadcast signal receiving section 4.

In this video and audio outputting apparatus, if the user manipulates a function key or a remote controller, the working command inputting section 2 receives the input of the user for transfer to the micro-computer 1.

The micro-computer 1 controls the broadcast signal receiving section 4 to receive the television broadcast signals of the channel which has been selected by the user. Then the micro-computer 1 separates the received signals into the video signals and audio signals to output them.

The video signals and the audio signals which have been outputted from the broadcast signal receiving section 4 are inputted into the video signal processing section 5 and the audio signal processing section 6, respectively.

The micro-computer 1 controls the video signal processing section 5 and the audio signal processing section 6, so that external video and audio signals and the video and audio signals from the broadcast signal receiving section 4 can be selected and so that the selected video and audio signals can be processed in the video and audio modes set by the user.

Figure 3A:
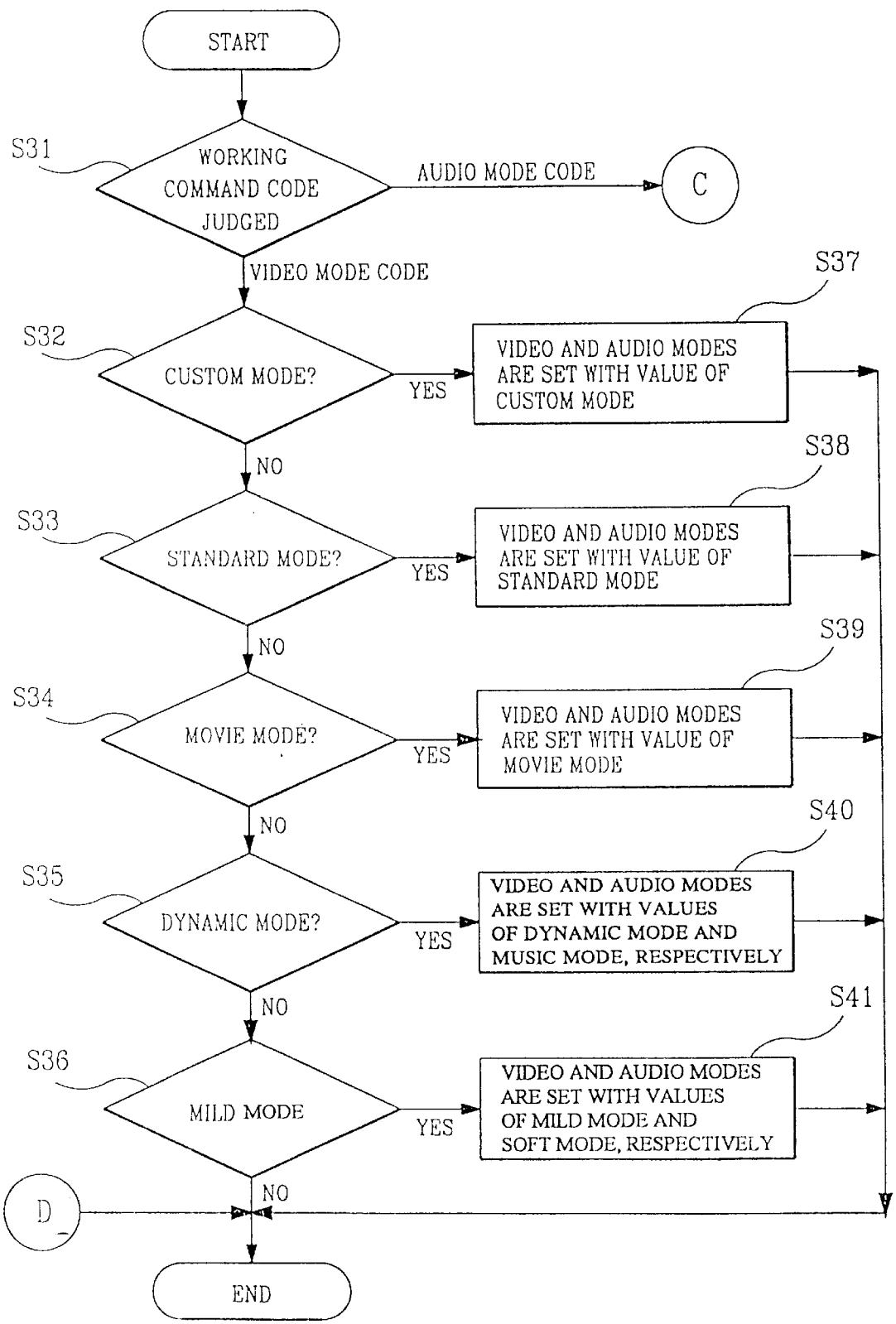
FIGS. 3A and 3B are flow charts showing the video/audio mode control method according to the invention.
Figure 3B:
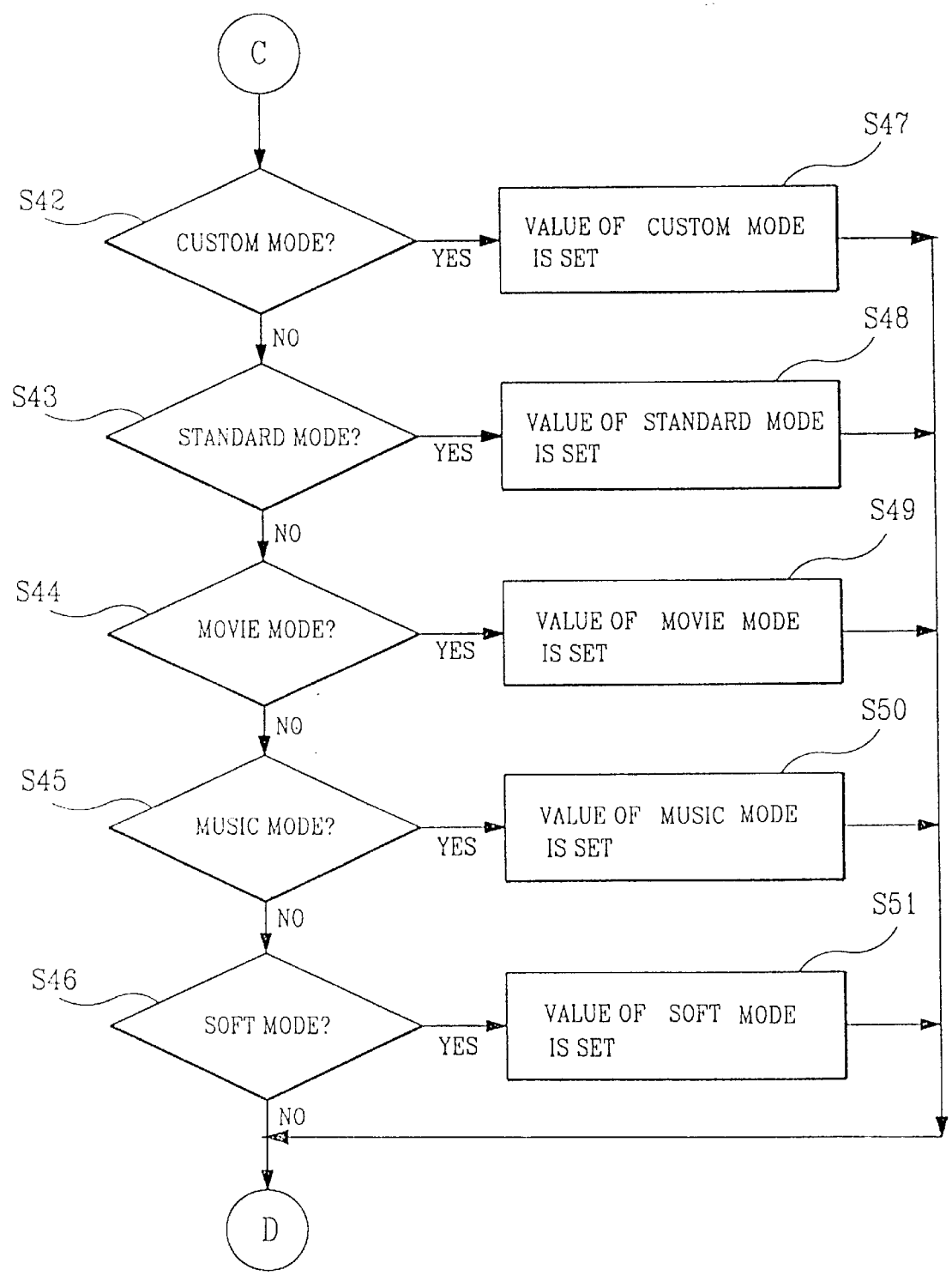

FIG. 3 is a flow chart showing the video/audio mode control method according to the invention.

As shown in FIG. 3, at step S31, the micro-computer 1 judges the working command code from the working command inputting section 2. If the working command code thus judged is a video mode code, the micro-computer 1 judges at steps S32–S36 whether the video mode code is a custom mode, a standard mode, a movie mode, a dynamic mode or a mild mode.

If the video mode code which has been judged at steps S32–S36 is a custom mode, then values of the video and audio modes are set to the custom mode at step S37. If it is a standard mode, values of the video and audio modes are set to the standard mode at step S38. If it is a movie mode, values of the video and audio modes are set to the movie mode at step S39. If it is a dynamic mode, a value of the video mode is set to the dynamic mode, and a value of the audio mode is set to the music mode, at step S40. If it is a mild mode, a value of the video mode is set to the mild mode, and a value of the audio mode is set to the soft mode at step S41.

Meanwhile, if the working command code which has been judged at step S31 is an audio mode code, then it is judged at steps S42–S46 whether the audio mode code is a custom mode, a standard mode, a movie mode, a music mode or a soft mode.

If the audio mode code which has been judged at steps S42–S46 is a custom mode, then a value of the audio mode is set to the custom mode at step S47. If it is a standard mode, a value of the audio mode is set to the standard mode at step S48. If it is a movie mode, a value of the audio mode is set to the movie mode at step S49. If it is a music mode, a value of the audio mode is set to the music mode at step S50. If it is a soft mode, a value of the audio mode is set to the soft mode at step S51.

According to the invention, if the user selects the video signals to be processed in accordance with a desired video mode, then the audio mode is automatically set in relation to the selected video mode, so that the audio signals can be processed accordingly. Thus the user does not have to set both the video and audio modes separately, thereby eliminating the resulting inconvenience of the conventional method.

What is claimed is:

1. A method for controlling video/audio modes in a video/audio outputting apparatus, comprising the steps of:

(a) judging whether a user inputted working command code is a video mode code or an audio mode code;

(b) judging whether it is a custom mode, a standard mode, a movie mode, a dynamic mode or a mild mode, if the working command code judged at step (a) is a video mode code;

(c) setting a value to the video mode code judged at step (b), and at the same time, setting a value to the audio mode which corresponds to the inputted command video mode code;

(d) judging whether it is a custom mode, a standard mode, a movie mode, a music mode or a soft mode, if the working command code judged at step (a) is an audio mode code; and (e) setting a value to the audio mode code judged at step (d).

2. The method according to claim 1, wherein step (c) comprises the substeps of:

setting values of the video and audio modes to a custom mode, if a video mode code thus judged is a custom mode;

setting values of the video and audio modes to a standard mode, if a video mode code thus judged is a standard mode;

setting values of the video and audio modes to a movie mode, if a video mode code thus judged is a movie mode;

setting a value of the video mode to a dynamic mode, and setting a value of the audio mode to a music mode, if a video mode code thus judged is a dynamic mode; and setting a value of the video mode to a mild mode, and setting a value of the audio mode to a soft mode, if a video mode code thus judged is a mild mode.

3. The method according to claim 1, wherein step (e) comprises the substeps of:

setting a value of the audio mode to a custom mode, if an audio mode code thus judged is a custom mode;

setting a value of the audio mode to a standard mode, if an audio mode code thus judged is a standard mode;

setting a value of the audio mode to a movie mode, if an audio mode code thus judged is a movie mode;

setting a value of the audio mode to a music mode, if an audio mode code thus judged is a music mode; and setting a value of the audio mode to a soft mode, if an audio mode code thus judged is a mild mode.

4. A method for controlling video/audio modes in a video/audio outputting apparatus, comprising the steps of:

(a) judging whether a user inputted working command video mode code is a custom mode, a standard mode, a movie mode, a dynamic mode or a mild mode; and (b) setting a value to the video mode code judged at step (a), and at the same time, setting a value to the audio mode which corresponds to the inputted command video mode code.

5. The method according to claim 4, wherein step (b) comprises the substeps of:

setting values of the video and audio modes to a custom mode, if a video mode code thus judged is a custom mode;

setting values of the video and audio modes to a standard mode, if a video mode code thus judged is a standard mode;

setting values of the video and audio modes to a movie mode, if a video mode code thus judged is a movie mode;

setting a value of the video mode to a dynamic mode, and setting a value of the audio mode to a music mode, if a video mode code thus judged is a dynamic mode; and setting a value of the video mode to a mild mode, and setting a value of the audio mode to a soft mode, if a video mode code thus judged is a mild mode.

6. An apparatus for controlling video/audio modes in a video/audio outputting apparatus, comprising:

a micro-computer for controlling video and audio processing in accordance with video and audio modes selected by the working commands of a user and for automatically selecting one of a plurality of audio modes which corresponds to one of plural video modes selected by the working commands of the user;

a working command inputting section for inputting working commands into the micro-computer;

a broadcast signal receiving controlled by the micro-computer, for receiving broadcast signals of a selected channel and for outputting video and audio signals;

a video signal processing section controlled by the micro-computer, for selecting and processing external video signals and the video signals of the broadcast signal receiving section; and an audio signal processing section under the control of the micro-computer, for selecting and processing external audio signals and the audio signals of the broadcast signal receiving section.

7. The apparatus of claim 6 wherein:

said plurality of audio modes comprises a custom mode, a standard mode, a movie mode, a music mode and a soft mode; and said plural video modes comprises a custom mode, a standard mode, a movie mode, a dynamic mode and a mild mode.

* * * * *